United States Patent
Jia

(10) Patent No.: US 10,880,805 B2
(45) Date of Patent: Dec. 29, 2020

(54) MITIGATING USER EQUIPMENT OVERHEATING FOR 5G OR OTHER NEXT GENERATION NETWORK

(71) Applicant: AT&T Intellectual Property I, L.P., Atlanta, GA (US)

(72) Inventor: Yupeng Jia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/400,611

(22) Filed: May 1, 2019

(65) Prior Publication Data

US 2020/0351746 A1 Nov. 5, 2020

(51) Int. Cl.
*H04W 36/30* (2009.01)
*H04B 7/0456* (2017.01)
*H04W 72/04* (2009.01)
*H04W 36/00* (2009.01)

(52) U.S. Cl.
CPC .......... *H04W 36/30* (2013.01); *H04B 7/0486* (2013.01); *H04W 36/0061* (2013.01); *H04W 36/0072* (2013.01); *H04W 72/048* (2013.01)

(58) Field of Classification Search
CPC ............. H04W 36/30; H04W 36/0072; H04W 36/0061; H04W 72/048; H04B 7/0486
See application file for complete search history.

(56) References Cited

U.S. PATENT DOCUMENTS

2016/0239057 A1* 8/2016 Kocagoez ............... G06F 1/203

OTHER PUBLICATIONS

"Radio Resource Control (RRC); Protocol specification." 3GPP; 3GPP TS 38.331 version 15.2.1 Release 15; Jun. 2018. 299 pages.

* cited by examiner

*Primary Examiner* — Dady Chery
(74) *Attorney, Agent, or Firm* — Amin, Turocy & Watson, LLP

(57) ABSTRACT

Wireless network operations can choose a long-term evolution (LTE) and 5G new radio (NR) dual connectivity deployment architecture using LTE as the anchor radio access network (RAN) node and adding mmWave NR as a secondary node when available. However, dual LTE/NR radios can consume more power and contribute more heat, thus degrading performance of radio frequency components. The overheating can be addressed by the user equipment (UE) sending an information message to indicate areas in which it requests to operate with reduced capability. Consequently, the network can determine whether to grant the request, or the UE can switch between NR to LTE depending on NR downlink channel quality.

20 Claims, 10 Drawing Sheets

MITIGATING USER EQUIPMENT OVERHEATING FOR 5G OR OTHER NEXT GENERATION NETWORK

TECHNICAL FIELD

This disclosure relates generally to mitigating user equipment overheating. For example, this disclosure relates to facilitating resolving user equipment overheating for millimeter wave (mmWave) deployment for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to resolving user equipment overheating for mmWave deployment is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
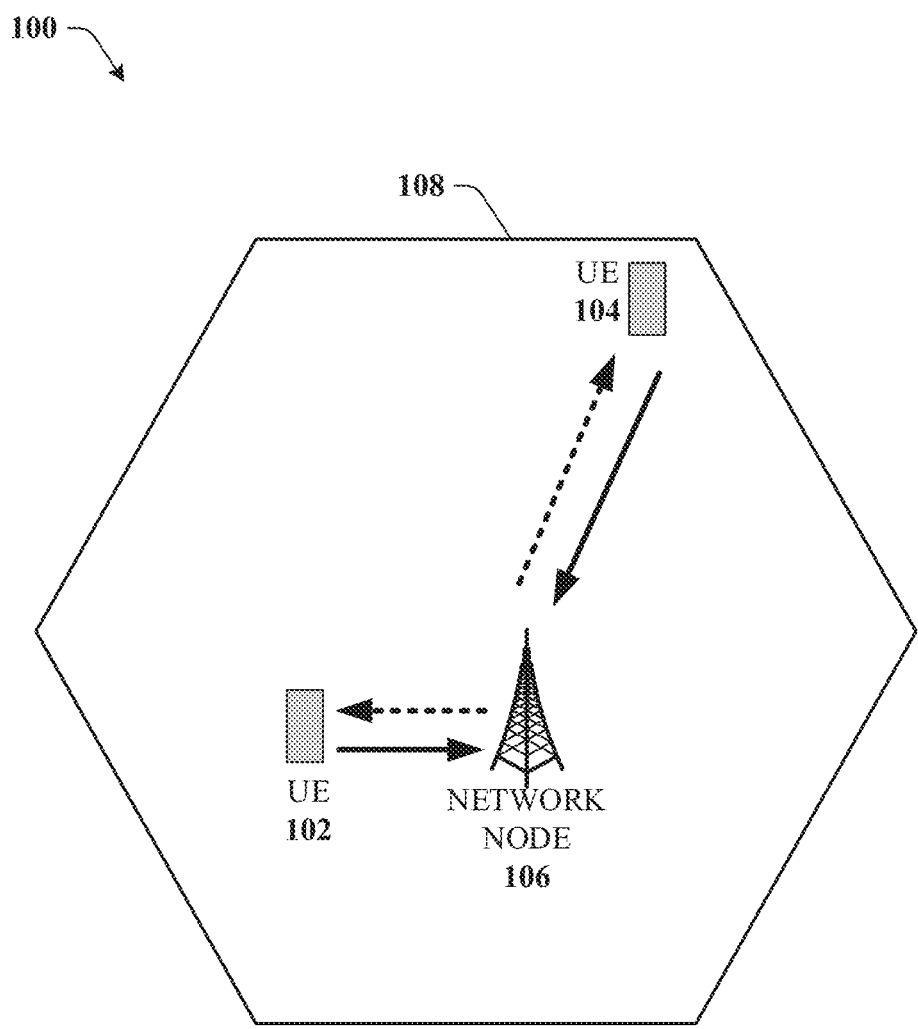
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to resolve user equipment overheating for mmWave deployment for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate resolving user equipment overheating for mmWave deployment for a 5G network. Facilitating resolving user equipment overheating for mmWave deployment for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

The use of high frequency spectrum above 24 GHz, loosely known as millimeter wave (mmWave) is merging as a key 5G technology. Service operators can choose an LTE-5G new radio (NR) dual connectivity deployment architecture (e.g., using LTE as an anchor radio access network (RAN) node and adding mmWave NR as secondary node when available). The use of these mmWave bands can enable extremely high data rates. However, dual LTE/NR radios can consume more power and contribute more heat. Because performance of radio frequency (RF) components can degrade with excessive heat, UE devices can shut down if the temperature rises above maximum safe operation temperatures. The UE device can be usable again once the temperature cools down to a safe operating range. However, shutting down mmWave RF radios can cause data transmission disruption and degrade a user experience. In addition, overheating of UE devices can cause UE device damage.

Based on 3GPP, the UE device can use a UE assistance message, that can be found within an information element (IE), to indicate areas in which the UE device requests to operate with a reduced capability. Thus, the UE device can send a signal to the network to alert the network that the UE would like to modify a functionality to resolve an issue that the UE device is experiencing and/or is anticipating experiencing. However, it can be up to the network to determine whether to grant the request. For example, the UE device can request a "downgrade" of capability in specific geographical areas based on a number of carriers of a carrier addition, multiple-input multiple output (MIMO) rank, decrease/increase modulation scheme orders, decrease/increase discontinuous reception (DRX) cycles, etc.

This disclosure proposes two protection mechanisms that can be utilized in conjunction with the UE assistance information message to address the UE device overheating. Due to the high path loss of millimeter wave (mmW) spectrum, 5G NR mmW deployment can utilize dense network topologies with inter site distances (ISD) of a few hundred meters. The UE can have knowledge of what configuration is the cause of an overheating problem. 3GPP has a UEAssistance Information IE that can be used to indicate to the network to reduce capabilities to address the overheating issue. This disclosure proposes two protection mechanisms to add to the UEAssistance Information IE to address the UE overheating issue: 1) add "ThrottledThroughput" to UEAssistanceInformation IE in TS38.331 (e.g., ThrottledThroughput-DL INTEGER (0 . . . 31); ThrottledThroughput-UL INTEGER (0 . . . 31)); and/or 2) add "RadioLinkSwitch" to UEAssistanceInformation IE in TS38.331. The first solution can comprise the IE being passed from a source cell to a target cell in handover message.

With regards to the second solution, 3GPP has a downlink (DL) fast switch mechanism for DL data transmissions. The downlink data transmission can be switched between LTE and NR based on NR DL quality (e.g., channel quality indication (CQI) report). For example, if the UE device is experiencing poor NR quality, then the system can switch to LTE DL radio link. Otherwise, the system can switch to NR. Consequently, when UE runs into overheating scenarios (above a certain temperature threshold), this disclosure proposes to switch the DL transmission leg and add "radiolinkswitch" to the UEAssistance IE in TS38.331. Thus, switching the DL leg can effectively resolve the UE overheating issue. The "radioLinkSwitch" IE can be added to 3GPP TS 38.331 via the following data:

SwitchToNR-FR2-DL INTEGER (0 . . . 31),
SwitchToNR-FR2-UL INTEGER (0 . . . 31),
SwitchToNR-FR2-DL INTEGER (0 . . . 31),
SwitchToNR-FR2-UL INTEGER (0 . . . 31),
Fallback to LTE It should be noted that the first four options do not need to switch the radio bearers, and the LTE-NR dual connectivity can maintained. The last option, fall back to LTE, can switch the radio bearer and the UE device can connect to the network the same as a legacy LTE device. Thus, when the UE device runs into an overheating issue, the UE device can indicate that it is switching the DL and/or the UL data transmission leg (e.g., from NR to LTE or vice versa). Additionally, during handover, this IE can be passed from the source cell to the target cell in the handover message. It should also be noted that the reduced quality of service and/or the switching the data transmission can be a function of time based on the temperature of the UE device. For instance, if the temperature has exceeded the threshold temperature by X degrees, then the network can reduce the quality of service and/or UE capabilities for Y amount of time. Alternatively, the UE device can send an additional message to the network once the UE device temperature has decreased by X degrees and/or back below the threshold temperature.

In one embodiment, described herein is a method comprising sending, by a mobile device comprising a processor to a network device of a wireless network, request data representative of a request to operate at a reduced capacity in response to a temperature threshold condition being determined to have been satisfied. The method can comprise sending, by the mobile device to the network device, recommendation data representative of a recommended throughput for the network device to facilitate. Additionally, in response to the sending the request data and the recommendation data, the method can comprise receiving, by the mobile device from the network device, downgrade data, wherein the downgrade data is representative of a downgrade from a first capability to a second capability lower than the first capability.

According to another embodiment, a system can facilitate, determining that a temperature threshold condition of a mobile device has been satisfied. In response to the determining the temperature threshold condition has been satisfied, the system operations can comprise receiving, from the mobile device, request data representative of a request to modify a radio link associated with the mobile device and a wireless network. Furthermore, in response to the request to modify the radio link, the system operations can comprise, modifying a data transmission between the wireless network and the mobile device.

According to yet another embodiment, described herein is a machine-readable storage medium that can perform the operations comprising receiving request data representative of a request of a mobile device to operate at a reduced capacity in response to a temperature threshold condition being determined to have been satisfied. The machine-readable storage medium can perform the operations comprising receiving recommendation data representative of a recommended throughput to be facilitated by a network device of a wireless network. Furthermore, in response to the receiving the request data and the recommendation data, the machine-readable storage medium can perform the operations comprising facilitating a downgrade of a capability of the mobile device from a first capability to a second capability lower than the first capability.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
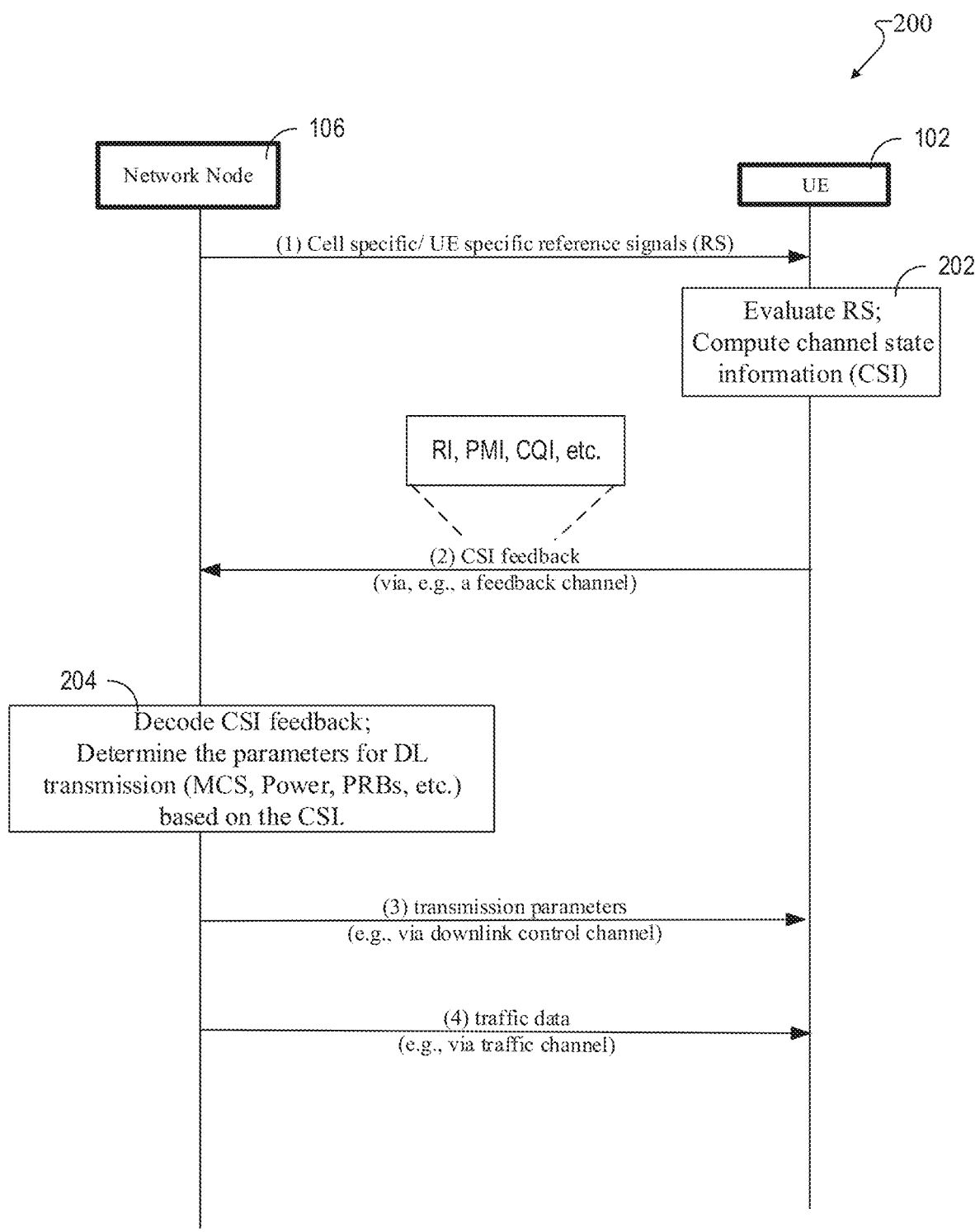
FIG. 2 illustrates an example schematic system block diagram of a UE in communication with a node device according to one or more embodiments.

Referring now to FIG. 2, illustrated is an example schematic system block diagram of a UE in communication with a node device via a system 200. The system 200 comprises a network node (e.g., network node 106), can transmit a reference signal (RS) at transaction (1), which can be beam formed or non-beam formed, to a user equipment (e.g., UE 102). FIG. 2 illustrates a closed loop transaction diagram (e.g., sequence chart). Briefly described, in this technique, a reference signal is first sent from the network node to the UE. From the reference signals, the UE can compute the channel estimates and the parameters needed for channel state information (CSI) reporting. In LTE, the CSI report can comprise a channel quality indicator (CQI), preceding matrix index (PMI), rank information (RI), etc. The CSI report is sent to the network node via a feedback channel either on a periodic basis or on demand based CSI (e.g., aperiodic CSI reporting). The network node scheduler can use this information to choose the parameters for scheduling of this particular UE. The network node can send the scheduling parameters to the UE on the downlink control channel called the physical downlink control channel (PDCCH). After that, actual data transfer can take place from the network node to the UE on the physical downlink shared channel (PDSCH).

Downlink reference signals are predefined signals occupying specific resource elements within the downlink time-frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 202, the UE 102 can evaluate the reference signal and compute CSI, which can be transmitted to the network node as CSI feedback (e.g., a CSI report). The CSI feedback can comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE use different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE can transmit feedback that comprises recommendations for a suitable precoding matrix out of the appropriate codebook (e.g., points to the index of the precoder in one of the codebook entries). This UE feedback identifying the pre-coding matrix is called the pre-coding matrix indicator (PMI). The UE is thus evaluating which pre-coding matrix would be more suitable for the transmissions between the network node and UE.

Additionally, the CSI feedback can comprise an indicator of channel quality (e.g., in LTE the channel quality indicator (CQI)), which indicates the channel quality of the channel between the network node and the user equipment for link adaptation on the network side. Depending on which value that a UE reports, the node can transmit data with different transport block sizes. If the node receives a high CQI value from the UE, then it can transmit data with larger transport block size, and vice versa.

Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can first decode the RI, and then use the decoded RI to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback at transaction (2), via a feedback channel, which can be a channel separate from the channel from which the reference signal was sent. The network node 106 can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 106, as shown in block 204 of FIG. 2, can comprise decoding the CSI feedback. The UE can decode the RI and then use the decoded information (for example, the obtained size of the CSI) to decode the remainder of the CSI feedback (e.g., the CQI, PMI, etc.). The network node 104 can use the decoded CSI feedback to determine a suitable transmission protocol, which can comprise modulation and coding schemes (MCS) applicable to modulation and coding of the different transmissions between the network node 106 and the UE 102, power, physical resource blocks (PRBs), etc.

The network node 106 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network node 106 to the UE 102.

Figure 3:
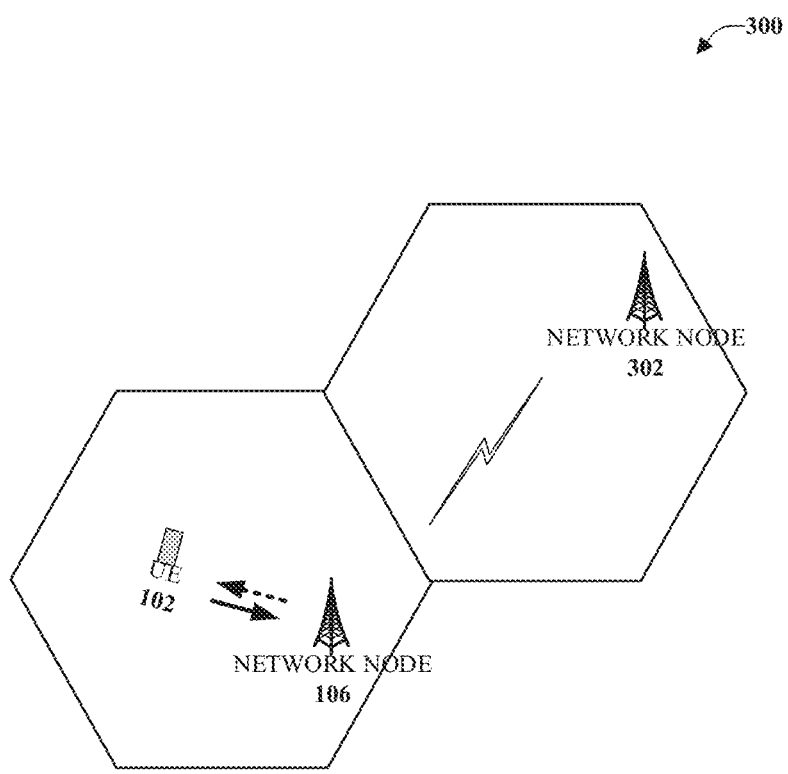
FIG. 3 illustrates an example schematic system block diagram of a system for transferring an information element from a source cell to a destination according to one or more embodiments.

Referring now to FIG. 3, illustrated is an example schematic system block diagram of a system 300 for transferring an information element from a source cell to a destination according to one or more embodiments.

FIG. 3 depicts the UE device 102 transitioning from the network node 106 (e.g., source network node) to a network node 302 (e.g., destination network node) Thus, when the UE device runs into overheating issue while connected to the network node 106, the UE device has two options. The UE device 102 can request to the network, via an IE sent to the network node 106, to reduce the UE devices 102 capabilities to address the overheating issue. Alternatively, the UE device can indicate, via an IE sent to the network node 106, that it is switching to a DL data transmission or an UL data transmission leg (e.g., switching from NR to LTE or vice versa). In either of the aforementioned scenarios, during the handover from the network node 106 to the network node 302, the IE can be passed from the network node 106 to the network node 302 in the handover message. Thus, the handover message from the network node 106 to the network node 302 can facilitate continuity in the resolution that either the UE device 102 or the network has implemented to address the overheating issue.

Figure 4:
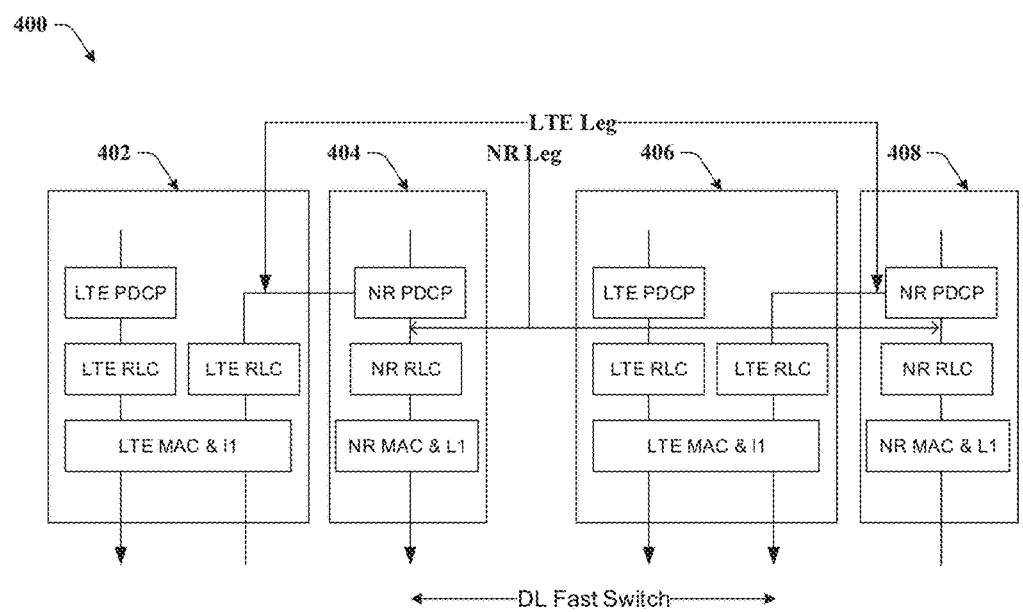
FIG. 4 illustrates an example schematic system block diagram of downlink fast switch system according to one or more embodiments.

Referring now to FIG. 4, illustrated is an example schematic system block diagram of downlink fast switch system 400 according to one or more embodiments.

Data throughput can be ran on both the LTE leg 402 and the NR leg 404 to facilitate simultaneous transmissions such that the throughput can be averaged between the LTE leg 402 and the NR leg 404. In a non-standalone (NSA) deployment both legs can be used simultaneously, LTE only can be used, or NR only can be used. However, instead of placing a limit on the throughput, the downlink fast switch system 400 can use the LTE leg 406 because the throughput is lower on the LTE leg 406 than the NR leg 408. For purposes of this example, it should be noted that the LTE leg 402 and the NR leg 402 are represented as being at a time T1 prior to the downlink fast switch occurring, which is then represented by the LTE leg 406 and the NR leg 408 after the downlink fast switch occurs. Thus, the UE device 102 can run a longer time on the LTE leg 406 such that the overheating issue can be mitigated and/or prevented. It should be noted that the LTE legs 402, 406 can be master nodes, the NR legs 404, 408 can be secondary nodes, and each node can respectively comprise packet data convergence protocol (PDCP) layers, radio link control (RLC) layers, media access control (MAC) layers, and physical layers (L1) for the LTE legs 402, 406 and the NR legs 404, 408. It should also be noted that although this disclosure is discussed with regards to an NSA 5G deployment, this disclosure can also be applicable to LTE, 5G standalone deployment, and/or any other next generation wireless communications system.

Figure 5:
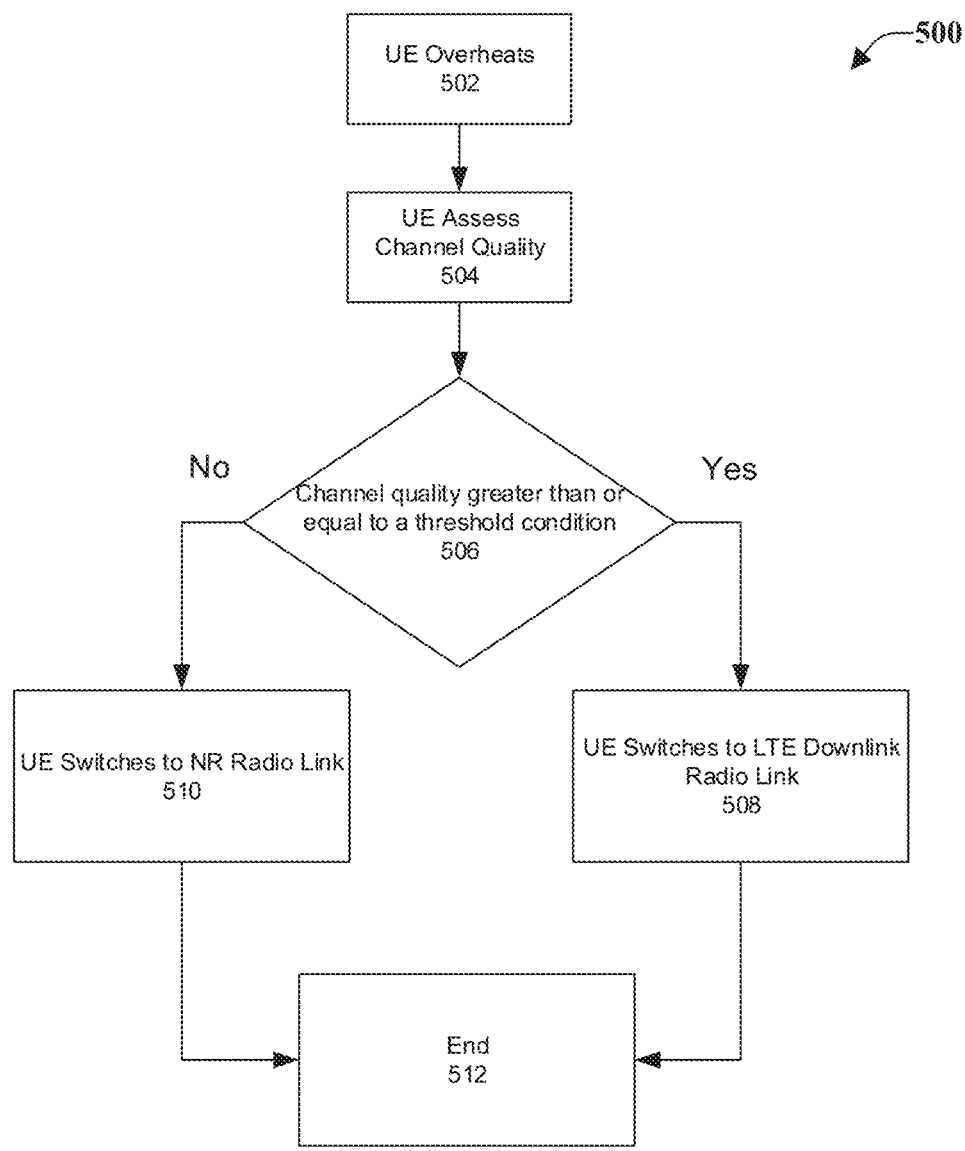
FIG. 5 illustrates an example schematic system flow diagram for mitigating user equipment device overheating according to one or more embodiments.

Referring now to FIG. 5 illustrates an example schematic system flow diagram 500 for mitigating user equipment device overheating according to one or more embodiments.

FIG. 5 depicts a flow diagram associated with the second overheating solution as defined above. At block 502, if the UE device 102 experiences an overheating issued based on the temperature of the UE device 102 and/or one of its internal components exceeding a threshold value, then the UE device 102 can assess a channel quality associated with a channel being used between the UE device 102 and the network device 106 at block 504. The UE device 106 can next assess if the channel quality is greater than or equal to a determined threshold value at block 506. If the channel quality is not greater than or equal to the determined threshold value at block 506, then the UE device 102 can switch to an NR radio link at block 510 and end at block 512. However, if the channel quality is greater than the determined threshold value at block 506, then the UE device 102 can switch to an LTE downlink radio link at block 508 and end at block 512. By switching to the LTE downlink radio link at block 508, the UE device 102 is inherently reducing the throughput needed for communication, thereby creating less strain/heat for the UE device 102 and/or its internal/external components.

Figure 6:
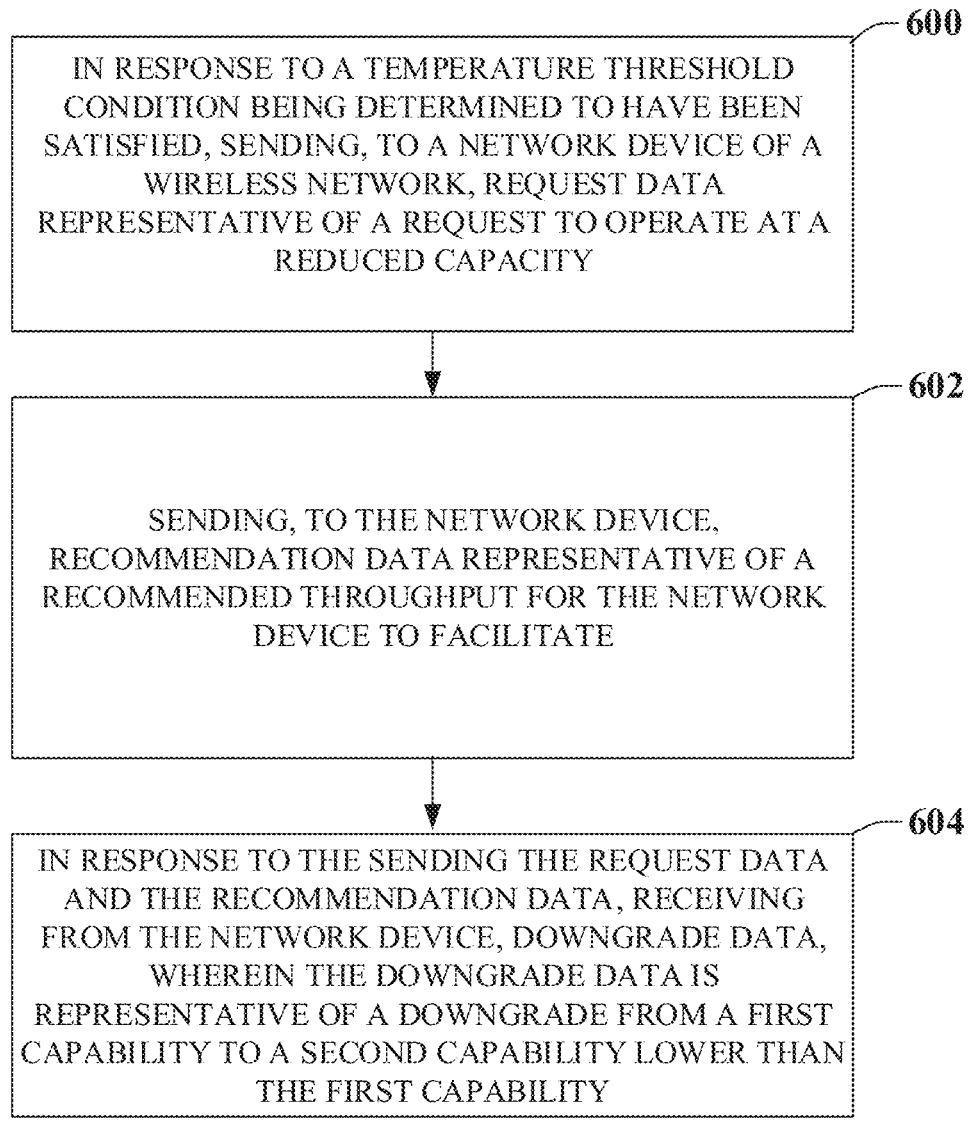
FIG. 6 illustrates an example flow diagram for a method for mitigating user equipment device overheating for a 5G network according to one or more embodiments.

Referring now to FIG. 6, illustrated is an example flow diagram for a method for mitigating user equipment device overheating for a 5G network according to one or more embodiments. At element 600, the method can comprise sending (e.g., via the UE device 102), to a network device (e.g., the network node 106) of a wireless network, request data representative of a request to operate at a reduced capacity in response to a temperature threshold condition being determined to have been satisfied. At element 602, the method can comprise sending (e.g., via the UE device 102) to the network device (e.g., the network node 106), recommendation data representative of a recommended throughput for the network device to facilitate. Additionally, at element 604, in response to the sending the request data and the recommendation data (e.g., via the UE device 102), the method can comprise receiving (e.g., by the UE device 102), from the network device (e.g., the network node 106), downgrade data, wherein the downgrade data is representative of a downgrade from a first capability to a second capability lower than the first capability.

Figure 7:
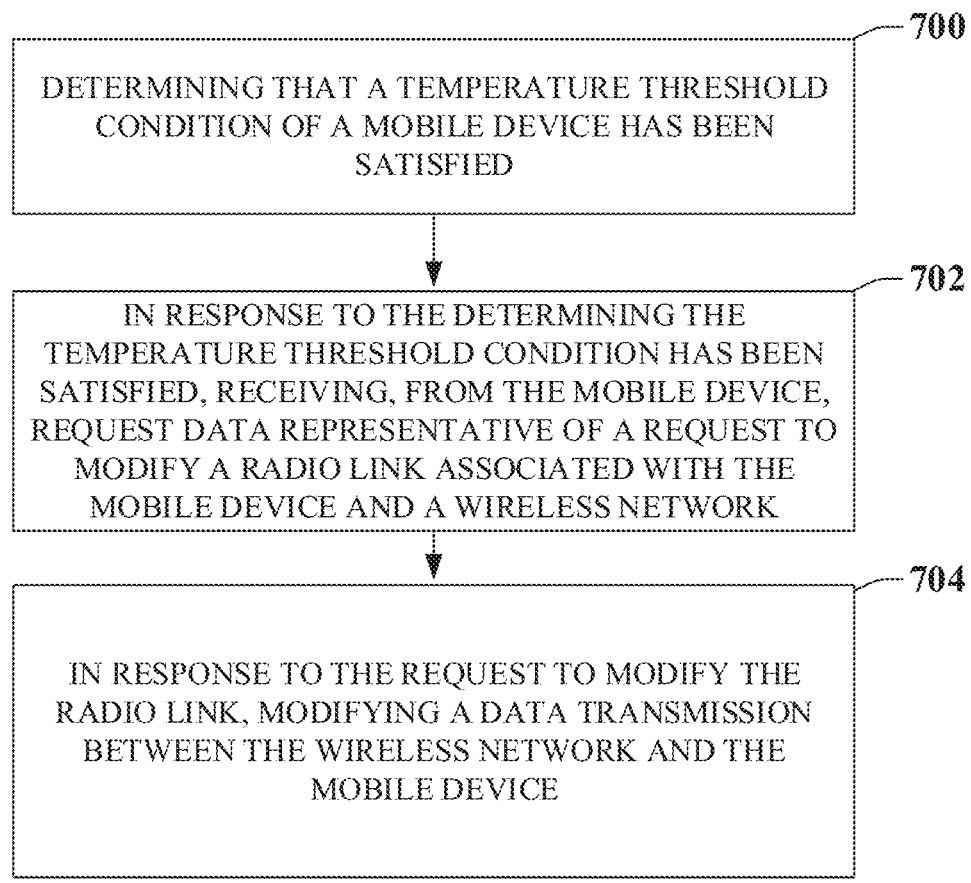
FIG. 7 illustrates an example flow diagram for a system for mitigating user equipment device overheating for a 5G network according to one or more embodiments.

Referring now to FIG. 7, illustrated is an example flow diagram for a system for mitigating user equipment device overheating for a 5G network according to one or more embodiments.

At element 700, a system can facilitate, determining (e.g., by the UE device 102) that a temperature threshold condition of a mobile device (e.g., the UE device 102) has been satisfied. In response to the determining the temperature threshold condition has been satisfied, at element 702, the system operations can comprise receiving, from (e.g., by the network node 106) the mobile device (e.g., the UE device 102), request data representative of a request to modify a radio link associated with the mobile device (e.g., the UE device 102) and a wireless network. Furthermore, in response to the request to modify the radio link, the system operations can comprise modifying (e.g., via the network node 106) a data transmission between the wireless network and the mobile device (e.g., the UE device 102) at element 704.

Figure 8:
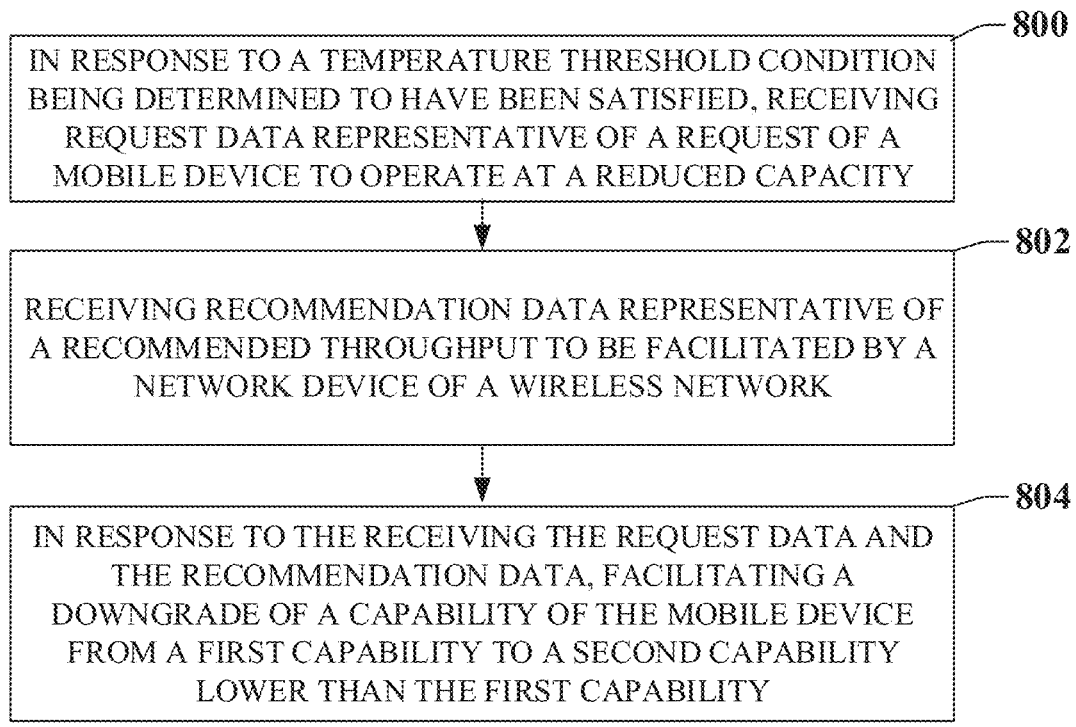
FIG. 8 illustrates an example flow diagram for a machine-readable medium for mitigating user equipment device overheating for a 5G network according to one or more embodiments.

Referring now to FIG. 8, illustrated is an example flow diagram for a machine-readable medium for mitigating user equipment device overheating for a 5G network according to one or more embodiments.

At element 800, a machine-readable storage medium can perform the operations comprising receiving request data representative of a request of a mobile device (e.g., the UE device 102) to operate at a reduced capacity in response to a temperature threshold condition being determined to have been satisfied. At element 802, the machine-readable storage medium can perform the operations comprising receiving (e.g., via the network node 106) recommendation data representative of a recommended throughput to be facilitated by a network device (e.g., the network node 106) of a wireless network. Furthermore, in response to the receiving the request data and the recommendation data (e.g., via the network node 106), at element 804, the machine-readable storage medium can perform the operations comprising facilitating a downgrade of a capability of the mobile device (e.g., the UE device 102) from a first capability to a second capability lower than the first capability.

Figure 9:
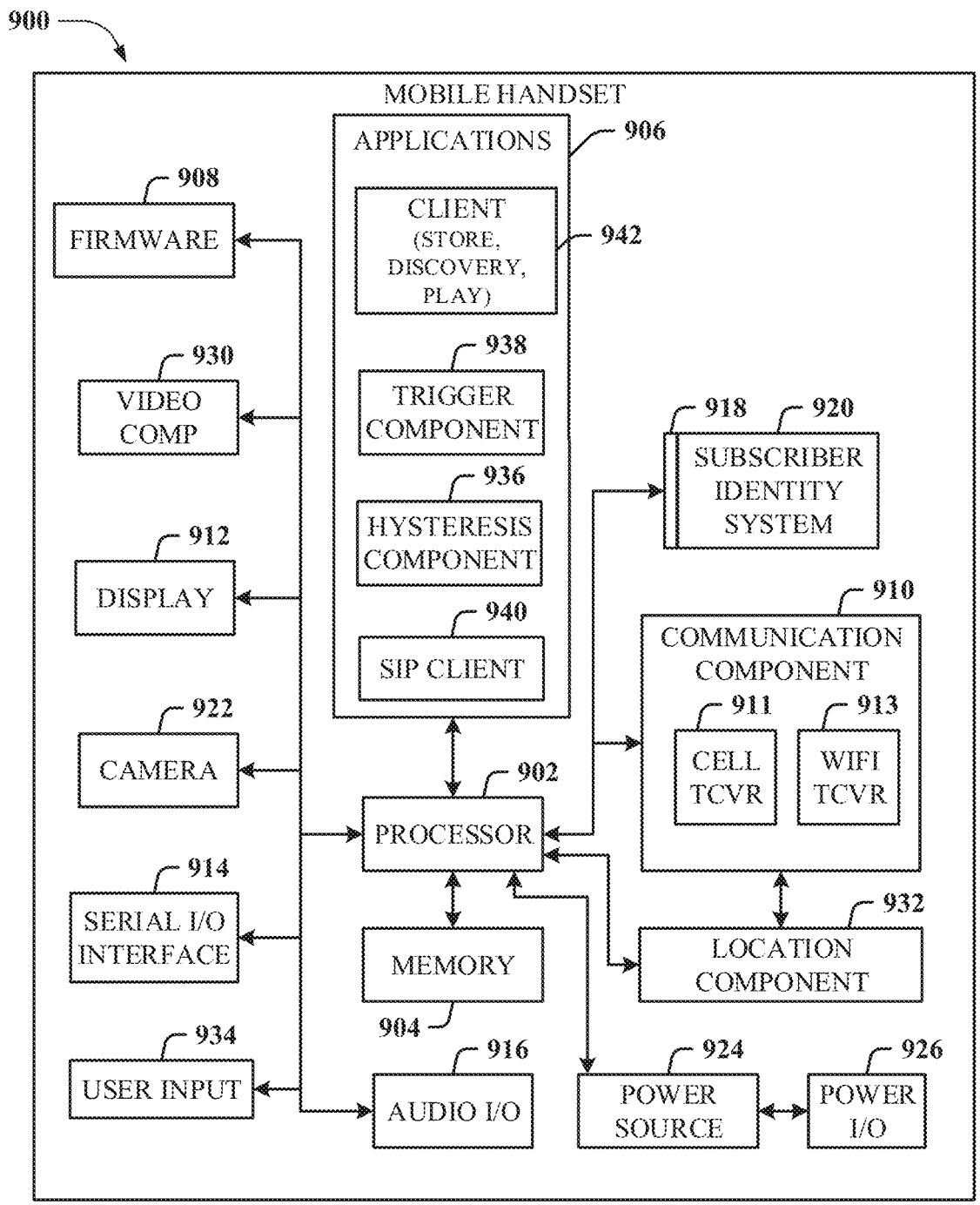
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
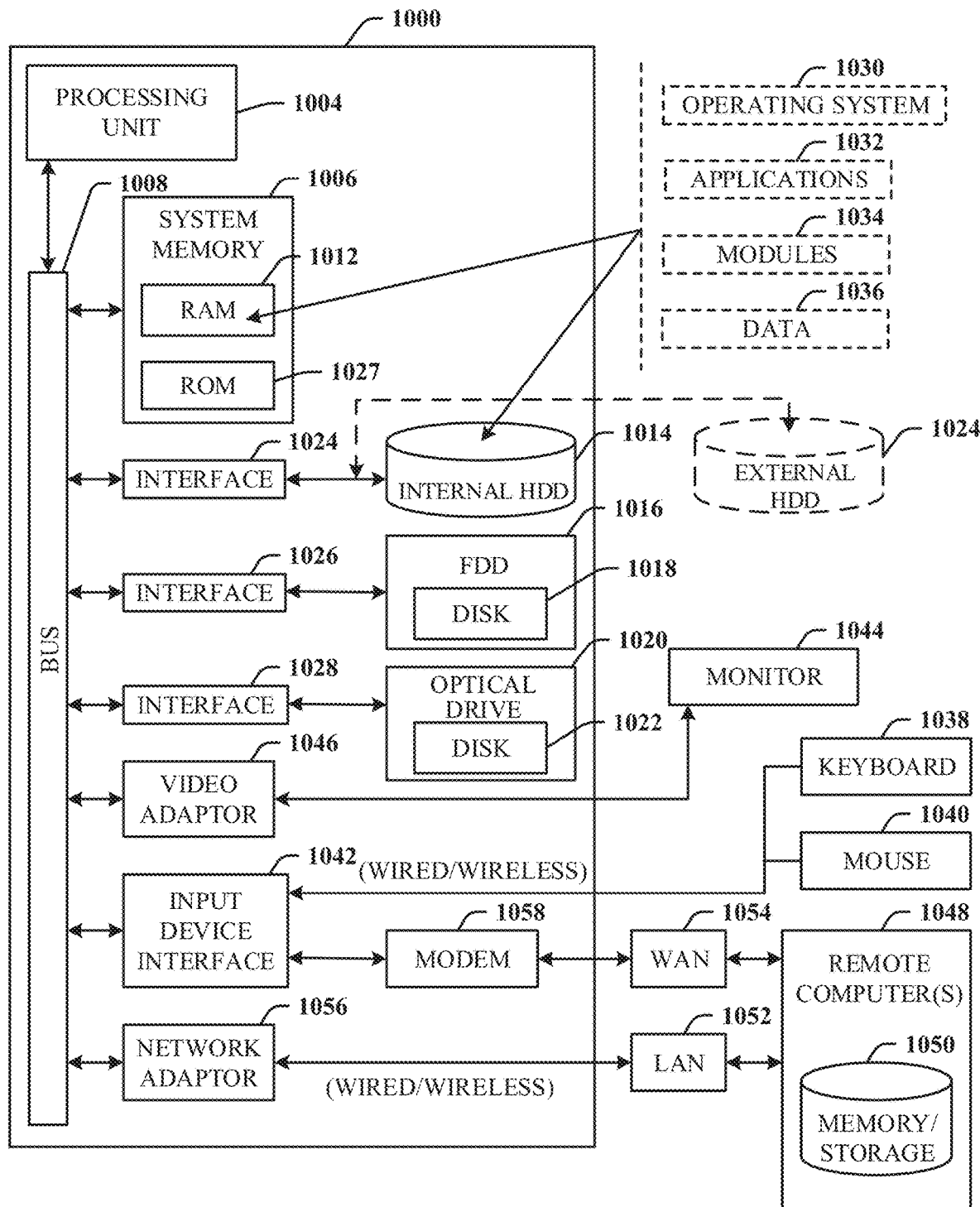
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to a temperature threshold condition being determined to have been satisfied, sending, by a user equipment comprising a processor to network equipment, request data representative of a request to operate at a reduced capacity based on an increase in a discontinuous reception cycle;
sending, by the user equipment to the network equipment, recommendation data representative of a recommended throughput for the network equipment to facilitate; and
in response to sending the request data and the recommendation data, receiving, by the user equipment from the network equipment, downgrade data, wherein the downgrade data is representative of a downgrade from a first capability to a second capability lower than the first capability, wherein the downgrade is applicable according to a function of time associated with the temperature threshold condition being determined to have been satisfied.

2. The method of claim 1, wherein the downgrade comprises a carrier number downgrade from a first number of carriers to a second number of carriers less than the first number of carriers.

3. The method of claim 1, wherein the downgrade comprises a rank value downgrade from a first multiple input multiple output rank value to a second multiple input multiple output rank value less than the first multiple input multiple output rank value.

4. The method of claim 1, wherein the request comprises a request to throttle a throughput associated with a network capacity.

5. The method of claim 1, wherein the request is a first request, and wherein the request data comprises radio link switch data representative of a second request to switch a radio link.

6. The method of claim 5, wherein the radio link switch data comprises a modification request representative of a modification from an uplink radio to a downlink radio.

7. The method of claim 5, wherein the radio link switch data comprises a modification request representative of a modification from a downlink radio to an uplink radio.

8. A system, comprising:
a processor; and
a memory that stores executable instructions that, when executed by the processor, facilitate performance of operations, comprising:
determining that a temperature threshold condition of a user equipment has been satisfied;
in response to determining the temperature threshold condition has been satisfied, receiving, from the user equipment, request data representative of a request to modify a radio link associated with the user equipment and a network, based on a decrease in a discontinuous reception cycle; and
in response to the request to modify the radio link, modifying a data transmission between the network and the user equipment, wherein modifying the data transmission is performed as a function of time associated with the temperature threshold condition being determined to have been satisfied.

9. The system of claim 8, wherein modifying the data transmission comprises implementing a handover of the data transmission from a new radio device to a long term-evolution device.

10. The system of claim 9, wherein modifying the data transmission is based on a downlink channel quality associated with the new radio device.

11. The system of claim 9, wherein the operations further comprise:
   transmitting the request data from a source cell device to a destination cell device during the handover.

12. The system of claim 8, wherein modifying the data transmission comprises a handover of the data transmission from a long term-evolution device to a new radio device.

13. The system of claim 12, wherein the operations further comprise:
   transmitting the request data from a source cell device to a destination cell device during the handover.

14. The system of claim 12, wherein modifying the data transmission is based on a channel quality indicator associated with a downlink channel of the new radio device.

15. A non-transitory machine-readable medium, comprising executable instructions that, when executed by a processor, facilitate performance of operations, comprising:
   in response to a temperature threshold condition being determined to have been satisfied, and based on an increase in a discontinuous reception cycle, receiving request data representative of a request of a mobile device to operate at a reduced capacity;
   receiving recommendation data representative of a recommended throughput to be facilitated by network equipment; and
   in response to receiving the request data and the recommendation data, facilitating a downgrade of a capability of the mobile device from a first capability to a second capability lower than the first capability, wherein the downgrade is facilitated until a time condition has been determined to have been satisfied after the temperature threshold condition has been determined to have been satisfied.

16. The non-transitory machine-readable medium of claim 15, wherein the temperature threshold condition is a first temperature threshold condition, and wherein the operations further comprise:
   in response a second temperature threshold condition being determined to have been satisfied, facilitating upgrading the capability of the mobile device from the second capability to the first capability.

17. The non-transitory machine-readable medium of claim 15, wherein the capability is associated with a network carrier.

18. The non-transitory machine-readable medium of claim 15, wherein the capability is associated with a multiple input multiple output rank associated with the network equipment.

19. The non-transitory machine-readable medium of claim 15, wherein the request to operate at the reduced capacity comprises a request to switch communication from long-term evolution network equipment to new radio network equipment.

20. The non-transitory machine-readable medium of claim 15, wherein the request to operate at the reduced capacity comprises a request to switch communication from new radio network equipment device to long-term evolution network equipment.

\* \* \* \* \*